United States Patent [19]

Boutier et al.

[11] Patent Number: 4,802,904
[45] Date of Patent: Feb. 7, 1989

[54] METHOD AND APPARATUS FOR POSITIONING OF GLASS PLATES TO BEND THEM INTO A CONVEX SHAPE

[75] Inventors: Philippe Boutier, Thourotte, France; Luc Vanaschen, Eupen, Belgium

[73] Assignee: Saint-Gobain Vitrage, Paris, France

[21] Appl. No.: 74,024

[22] Filed: Jul. 16, 1987

[30] Foreign Application Priority Data

Jul. 16, 1986 [FR] France ................. 86 10329

[51] Int. Cl.[4] ............................................. C03B 23/02
[52] U.S. Cl. ........................................ 65/106; 65/104; 65/107; 65/273; 65/287
[58] Field of Search ................. 65/104, 106, 107, 273, 65/287

[56] References Cited

U.S. PATENT DOCUMENTS

| | | | |
|---|---|---|---|
| 3,607,200 | 9/1971 | McMaster | 65/104 X |
| 4,204,854 | 5/1980 | McMaster et al. | 65/104 X |
| 4,386,952 | 6/1983 | Nitschke | 65/273 X |
| 4,475,937 | 10/1984 | Nitschke | 65/273 X |

*Primary Examiner*—Arthur Kellogg
*Attorney, Agent, or Firm*—Oblon, Fisher, Spivak, McClelland & Maier

[57] ABSTRACT

A process for bending glass plates into convex shape and, in particular, to their precise positioning with a view to that bending. The glass plates to be convexed are centered while a hot gas is blown under said plates in order to take up a part of the weight of the glass thanks to that blown gas. It makes possible a recentering of the glass plates without deterioration of said plates in spite of their friction on the rollers carrying them.

8 Claims, 2 Drawing Sheets

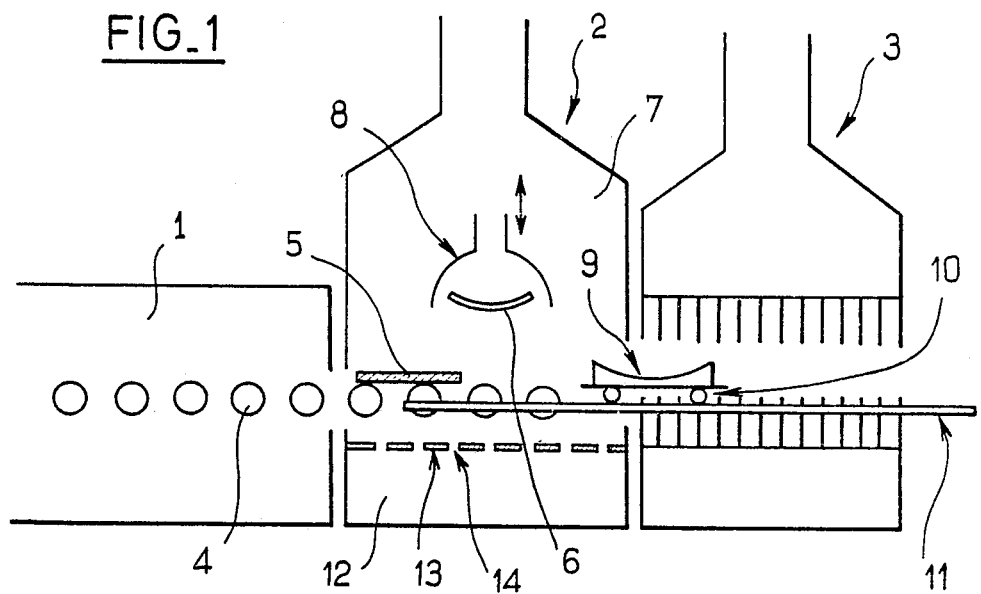
FIG_1
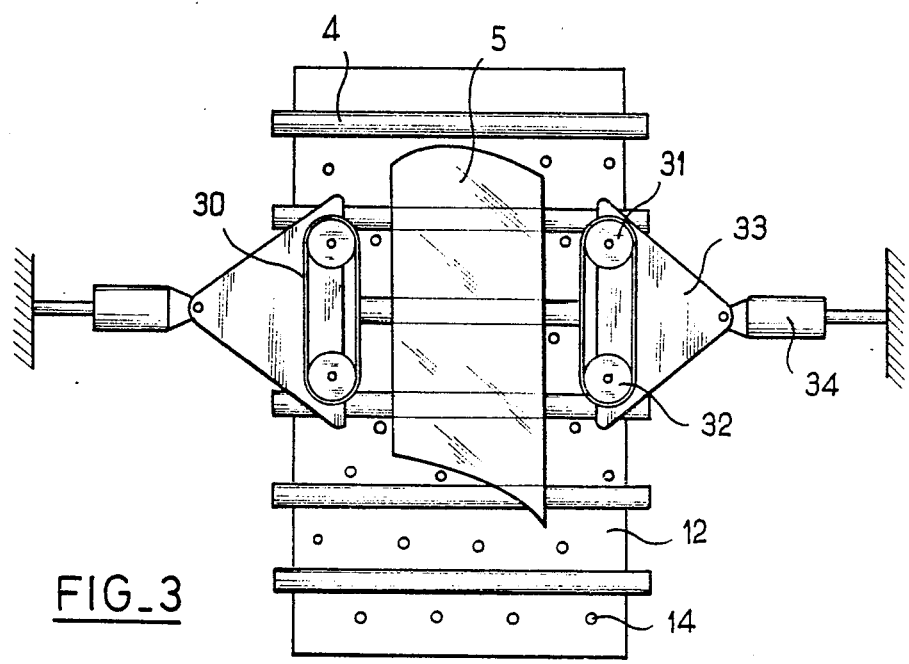
FIG_3

METHOD AND APPARATUS FOR POSITIONING OF GLASS PLATES TO BEND THEM INTO A CONVEX SHAPE

BACKGROUND OF INVENTION

1. Field of the Invention

This invention relates to the convex bending of plates of thermoplastic materials and, in particular, of glass plates, available on a horizontal or roughly horizontal support, such as a delivery conveyor, that convexing taking place by application of the plates, brought to their softening temperature, against an upper mold and then possibly by sinking of said plates on a lower mold after being deposited or dropped on said lower mold, that lower mold generally consisting of a ring with curved section, open in the center, also called a skeleton.

2. Background of the Prior Art

The upper mold is a mold of the type described in French patent documents, one having been published under No. 2,085,464 and another filed under No. 8604962; that is, it is connected to a suction box and the suction of the box is exerted on the periphery of the mold, thus bringing the plates, notably, of glass, to be applied against said mold. The upper mold can also be of another type described in European patent publication No. 3,391, namely, it can consist of a unit drilled with holes, through which a vacuum is exerted.

The plates to be bent into convex shape, taking as an example only glass plates, knowing that they can nevertheless be of any thermoplastic material, are taken up by the upper mold thanks to the suction exerted on the periphery (patent document FR No. 2,085,464 or FR-A No. 8604962) or across the upper mold (European patent 3,391), or thanks to a stream of gas directed upward, against the glass sheet, so as to lift it (European patent 5,306).

The positioning of the glass plates under the upper mold has to be very precise, particularly, when said upper mold is curved.

When the glass plates arrive on a conveyor, their stop position under the upper mold can be very well controlled, in the longitudinal direction of passage of the conveyor, thanks to lugs, e.g., of the type described in the French patent document filed under No. 8513801.

On the other hand, the orientation and position in the directions crosswise to the direction of passage are more difficult to control. It is, of course, possible, as is done at the present time, to define the position of the glass plates far up the line, before they enter the reheating furnace preceding the convexing station. After a number of trials, the position to be given the glass plates can be defined above the furnace, so that they will be stopped in good position under the upper convexing mold. But that implies trial and error, necessitates frequent corrections, does not afford extreme precision and does not protect the plates from accidental deviations during their transport.

It is also possible to provide recentering devices for the glass plates under the upper mold, but that causes said plates to rub on their support, particularly, the rollers of the conveyor, which creates the risk of damaging the surface of the glass, and if the stresses applied on the edges of the plates in order to recenter them are really substantial, that can also damage the edges of the plates.

SUMMARY OF THE INVENTION

The present invention is aimed at making possible the centering of plates, notably, of glass, while eliminating or at least minimizing the resulting friction and defects on the surface and edges of the plates.

It comprises, for that purpose, a process of bending plates of thermoplastic materials, notably, of glass, into convex shape, using an upper mold against which said plates are applied and possibly a lower mold, notably, of ring-shaped type, on which the plates are deposited or dropped. Before being applied against the upper mold, the plates are subjected to the action of an ascending stream of gas, which is exerted on them, so as to take up a part of their weight, centering means then coming into play during the action of the stream of gas in order to give the plates the desired position.

That stream of gas is advantageously hot, so that the plates ready to be bent into a convex shape will not cool off.

In the case of convexing of plate glass of the standard thicknesses used in the automotive industry or construction, that is, around 3 or 4 millimeters, the dynamic glass blowing pressure is advantageously on the order of 5 to 30 mm water column.

The invention likewise proposes a system for applying the process, that system including a horizontal or roughly horizontal support of the plates, e.g., a roller conveyor, and convexing means comprising at least one convexing mold placed above the plate support. This system is provided with a pressurized gas tank under the support, closed on top by a baffle equipped with a large number of outlet through which gas jets are emitted and directed to the bottom surface of the plates, and also being provided with centering means of finger or guide bar type in the zone above that tank in order to act on the plates.

Insofar as the support of the plates, before they are grabbed by the upper mold, is a conveyor, those centering means are advantageously mobile in the longitudinal direction of the plates, so as to recenter said plates as they arrive.

BRIEF DESCRIPTION OF THE DRAWINGS

The invention will now be described in greater detail in relation to the attached figures, which represent the following:

FIG. 1: a general diagram of a installation for bending plates into convex shape;

FIG. 3: a diagram of the recentering means.

DETAILED DESCRIPTION OF THE INVENTION

Figure 2:
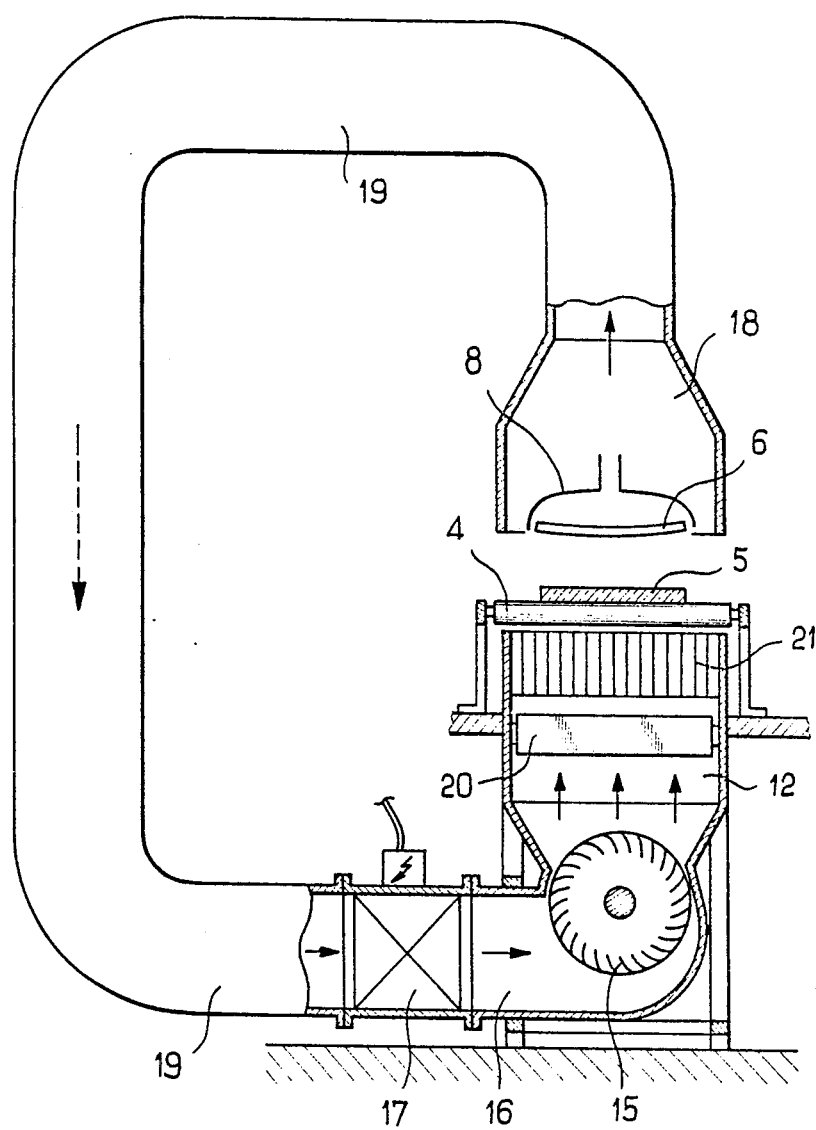
FIG. 2: a diagram of means of partial support arranged under the convexing mold.

FIG. 1 shows the assembly of a convexing installation using an upper mold and a lower mold, as well as a tempering station following the convexing station.

The invention remains identical, of course, if the tempering station is replaced by an annealing or flattening station or other station.

In FIG. 1 a glass reheating furnace 1, a convexing station 2 and a tempering station 3 are schematically represented. A roller conveyor 4 crosses the furnace 1 and brings the glass plates 5 under an upper convexing mold 6 placed inside a chamber 7 kept at high temperature. The mold 6 represented is of the type described in aforementioned French patent document No. 2,085,464, that is, it is connected to a suction box 8 and the vacuum is exerted on the periphery of the mold 6. That mold 6 is vertically mobile. A lower convexing mold 9, such as a frame or ring or other skeleton, mounted on a carriage 10, can be provided to recover each glass plate 5 after it has been released by the upper mold 6. That carriage 10 moves on rails 11, so that it can be advanced under mold 6 and then emptied outside the convexing station, in order, for example, to bring the glass plates 5 to the tempering station 3 which follows. The glass plates released by the upper mold 6 complete their convexing by sinking on the lower mold 9.

According to the invention, a pressurized gas tank 12 is provided, at least under the convexing station 2, being equipped on its upper face with a baffle 13 containing a multiple number of outlets 14, such as simple holes.

In an embodiment illustrated by FIG. 2, that pressurized gas tank 12 is fed by a fan 15 with, for example, cross-flow.

That fan 15 and that tank 12 form part of a gas blowing assembly comprising a feed channel 16 of the fan 15, electric heating means 17 placed at the head of the feed channel 16 in order to heat the stream of gas to the temperature of approximately 650° C. necessary for glass bending, a hood for recovery of the hot gas blown, placed above the upper convexing mold 6, a recycling duct 10, louvres 20 by which the flow of blown gas can be modified, and vertical baffles 21 which serve to regulate the flow of gas.

By regulating the speed of the fan and/or the position of the louvres 20, the rate of flow of hot gas and, notably, of air can be regulated so as to make a homogeneous dynamic pressure on the order of 5 to 30 mm water column and preferably on the order of 5 to 15 mm water column prevail under the glass plates. That pressure is regulated in accordance with the thickness and, therefore, with the weight of the glass sheets treated.

Thus, a part of the weight of the glass plates can be taken up by that stream of gas, on the order of 10 to several tens percent (up to 80%) of the total weight.

Consequently, the transport of the glass plates on the rollers of the conveyor is always assured, but the weight of the glass plates on the rollers is reduced and any recentering of said plates by sliding on their support can be effected with less friction than in the absence of such blowing and, therefore, with less or no deterioration of the surface of the glass and with less stress exerted on the edges of the glass. The limiting blowing pressure is that for which the glass would no longer rest on its support and, notably, the conveyor, in which case, transport would no longer be possible without an additional adapted drive means. At pressures just below that limiting state, the bearing on the conveyor would no longer be sufficient to assure a precise enough stop of the glass in the longitudinal direction of its advance.

The means of recentering of the glass plates in the crosswise direction are of the finger, guide bar, belt type, etc., arranged on the edges of the path of the glass plates, those fingers or guide bars being mobile in the crosswise direction in order to bear on the edges of the glass, push them and also fit different sizes of glass plates.

Those centering means are advantageously mobile longitudinally at the same time and manuever in the major direction of movement of the glass plates.

It can comprise belts 30 such as those shown on FIG. 3, each turning on two drums 31, 32, each assembly being mounted on a platen 33 movable in the direction of the glass thanks to a jack 34.

The push direction of those recentering means is the direction crosswise to the longitudinal direction of passage of the glass. If need be, of course, centering means in the longitudinal direction could also be adopted.

Thanks not only to those centering means, acting while a part of the weight of the glass is eliminated by the ascending blowing, the quality of the glass is not degraded, but, furthermore, the recentering operation is far more rapid than in the absence of the blowing operation.

Recentering can, of course, take place on individual glass plates, as well as on stacks of glass plates.

Recentering without alteration of the glass is of especially important interest in the case of complex shapes to be given glass plates, where extreme precision in the position of the glass under the upper convexing mold becomes imperative.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for bending plates of thermoplastic material into a convex shape, comprising:
    advancing said plates into a bending chamber, on a support means comprising a roller conveyor,
    supporting 10–80% of the weight of said plates while on said support means by way of a gas stream blown from below said support means,
    centering said glass plates with respect to their placement in the direction perpendicular to the advance of said glass plate, while said plates are so supported, and
    applying said plates against an upper mold.

2. Process of claim 1, further comprising subsequently depositing said plates on a lower mold.

3. Process according to claim 1, characterized in that the plates are comprised of glass and the stream of gas is hot and brough to a temperature on the order of 650° C.

4. Process according to claim 1, characterized in that the dynamic blowing pressure of said air stream is on the order of 5 to 30 mm water column for glass thickness on the order of 3 or 4 mm.

5. Process of claim 4, wherein said pressure is on the order of 5–15 mm water column.

6. Apparatus for bending glass plates, comprising a convexing installation having an upper convexing mold against which glass plates are intended to be applied, a support means comprising a roller conveyor for advancing said glass plates into a position below said upper convexing mold, a pressurized gas tank having an upper baffle equipped with a multiple number of outlets said outlets loated under the support means, said gas tank intended to blow a stream of gas in an ascending vertical direction in order to take up a part of the weight of the glass, and also comprising means for centering the glass plates with respect to their placement in the direction perpendicular to the advance of said glass plates, said centering taking place while the ascending stream of gas is working.

7. Apparatus according to claim 6, characterized in that the centering means are placed sideways to the delivery path of the glass plates under the upper convexing mold.

8. System according to claim 6, characterized in that the stream of gas blown under the glass plates is obtained by a gas blowing installation comprising heating means 17, a suction hood 18, a recycling duct, louvres and baffles.

* * * * *